Oct. 8, 1935.   J. S. STOKES   2,016,462
BOX MAKING SYSTEM
Original Filed April 11, 1933   14 Sheets-Sheet 1
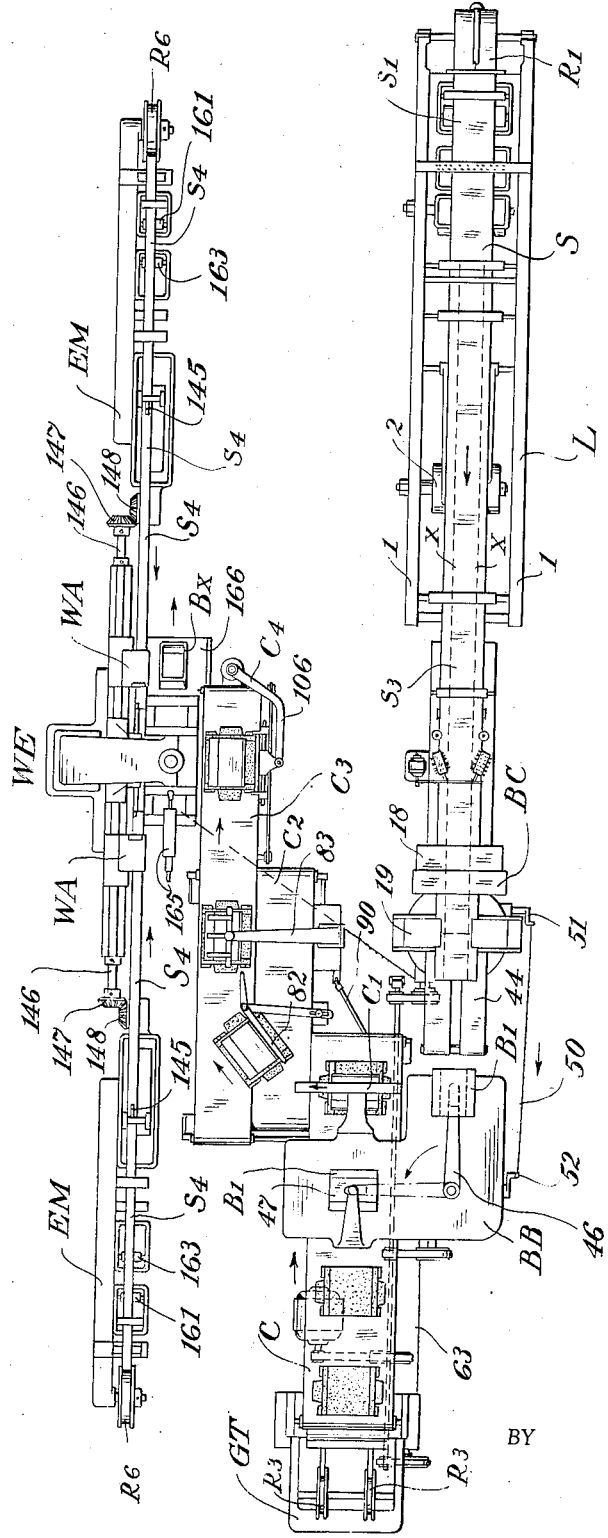
INVENTOR.
John S. Stokes
BY
Cornelius D. Ehret
his ATTORNEY.

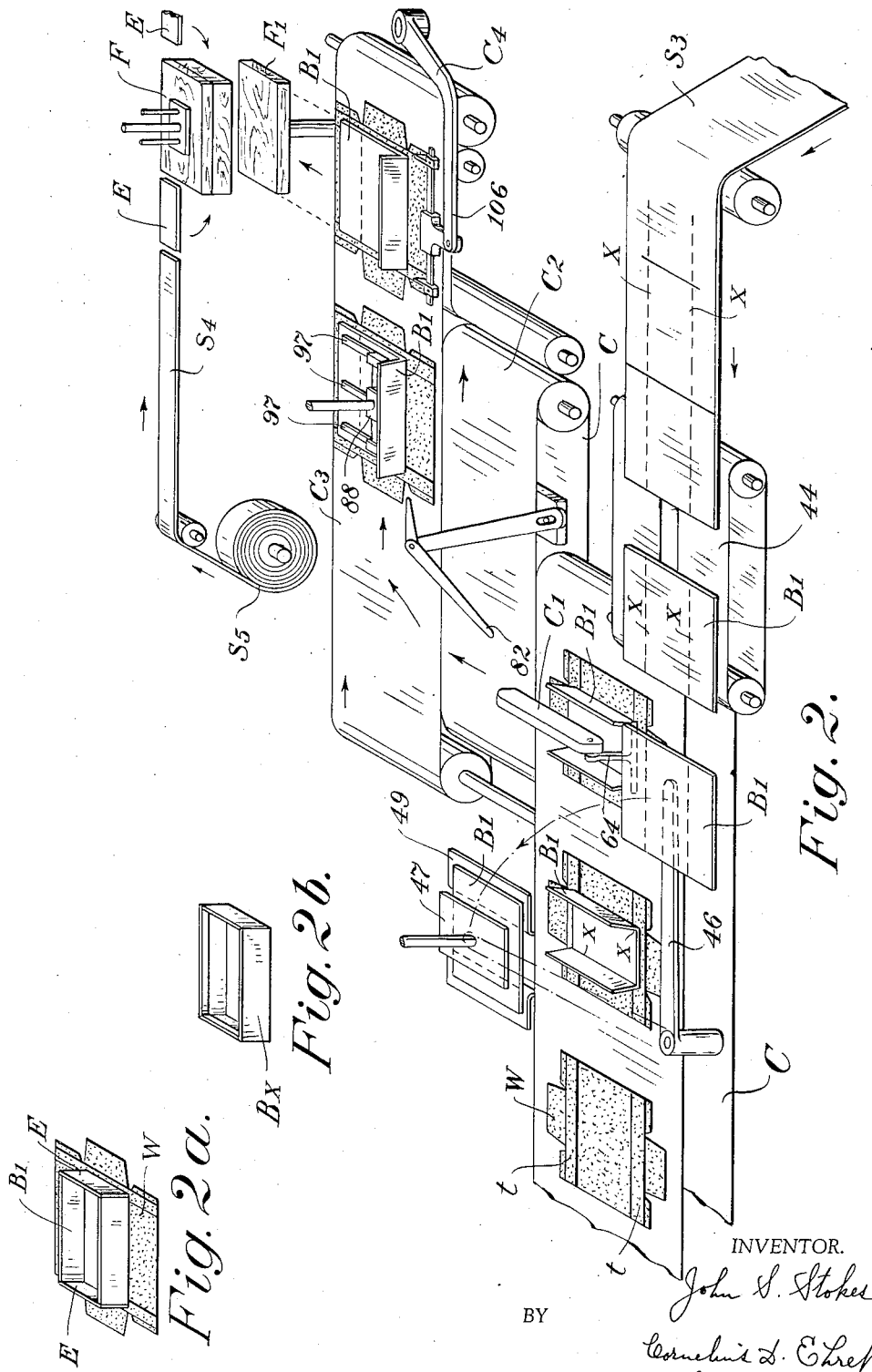

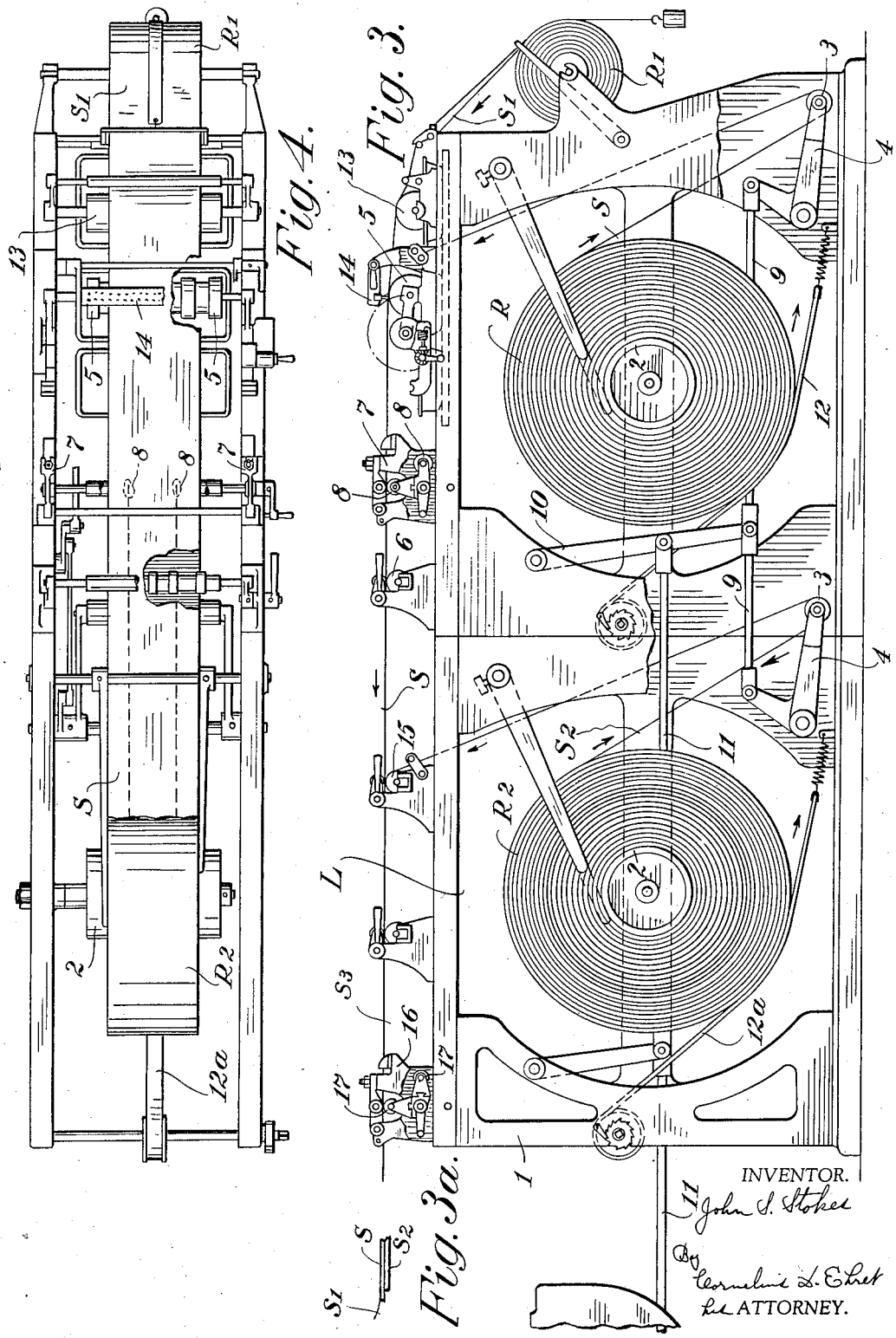

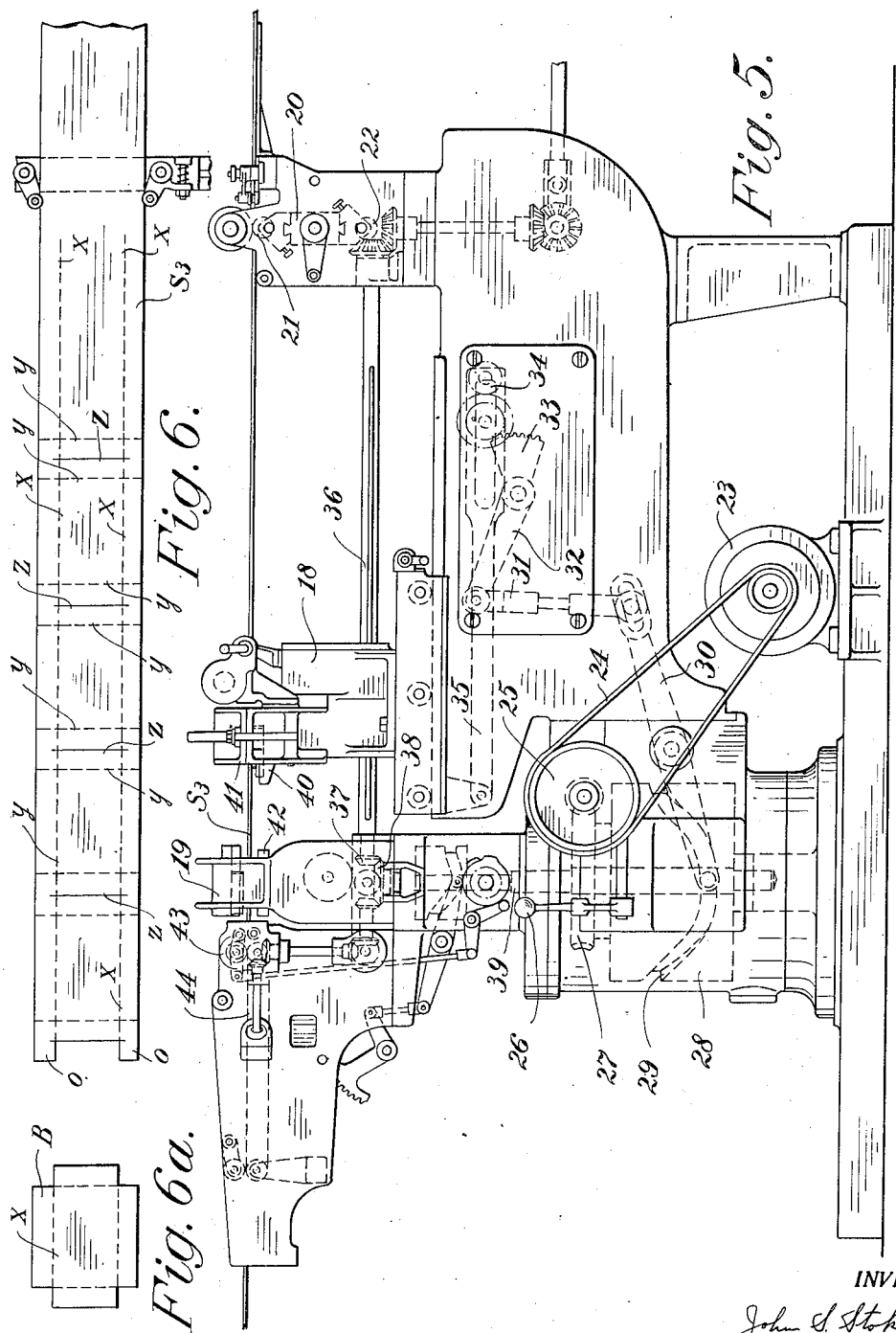

Oct. 8, 1935.  J. S. STOKES  2,016,462
BOX MAKING SYSTEM
Original Filed April 11, 1933  14 Sheets-Sheet 6

INVENTOR.
John S. Stokes
BY
Cornelius D. Ehret
ATTORNEY.

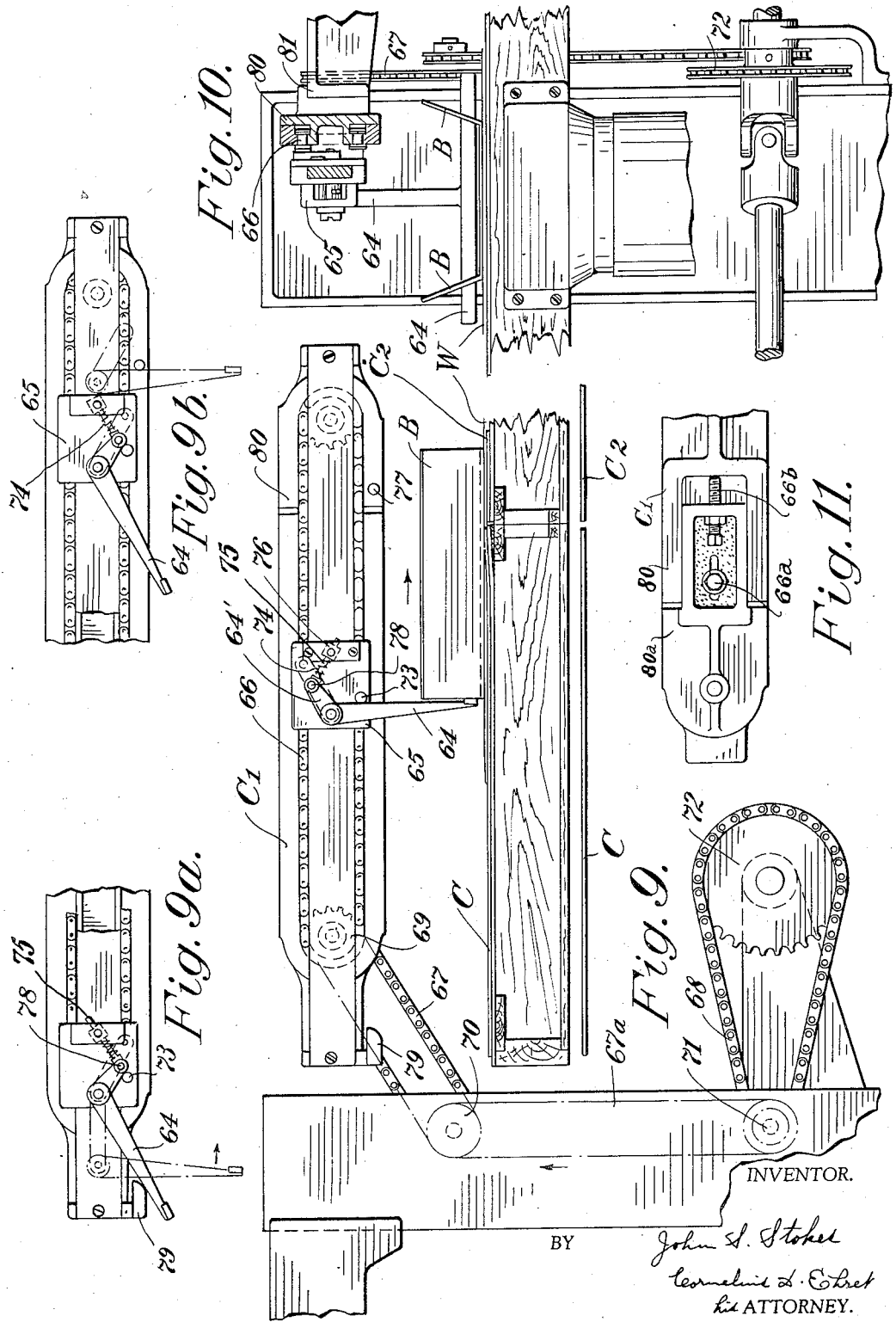

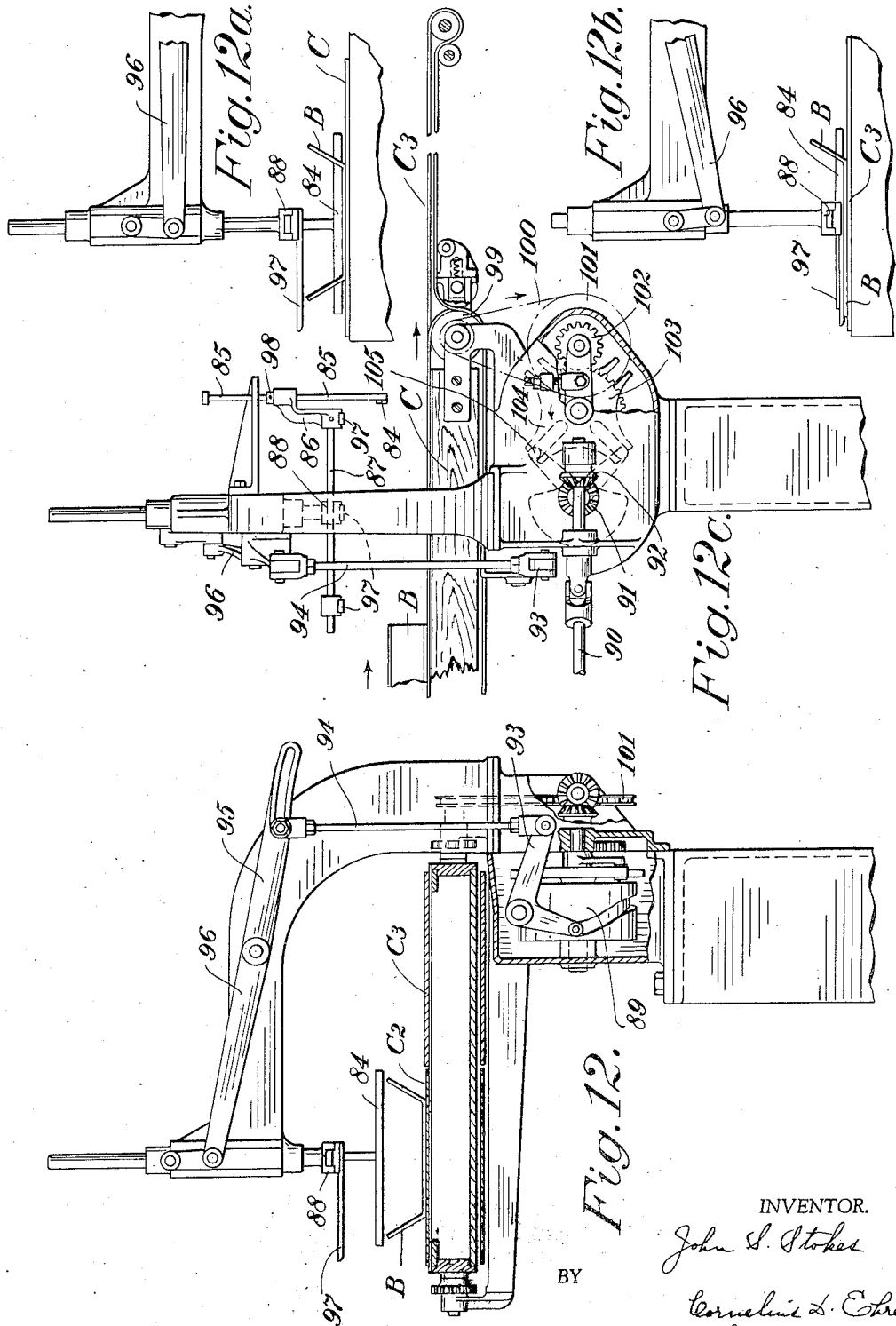

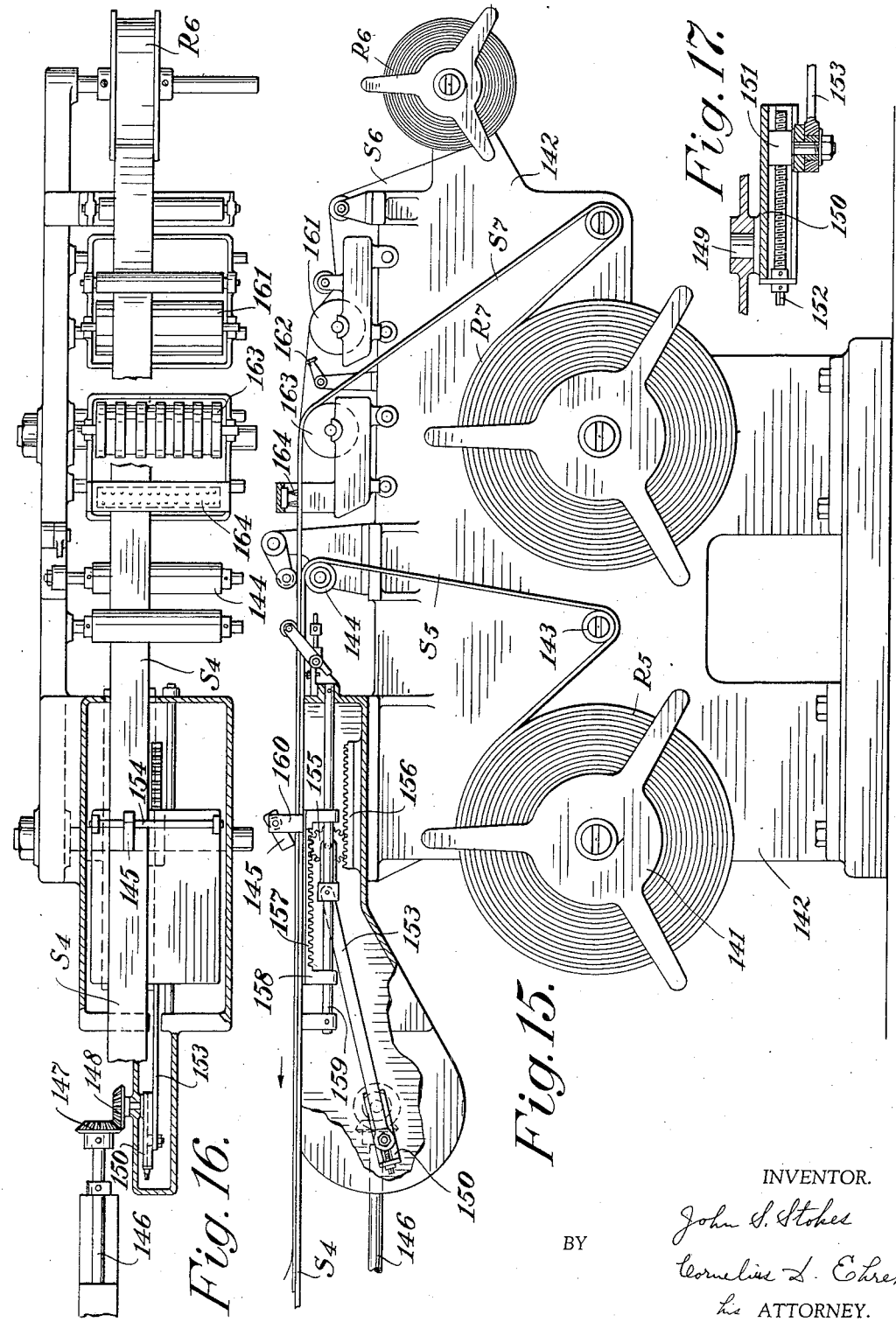
Oct. 8, 1935. J. S. STOKES 2,016,462
BOX MAKING SYSTEM
Original Filed April 11, 1933 14 Sheets-Sheet 11
INVENTOR.
John S. Stokes
Cornelius L. Ehret
his ATTORNEY.

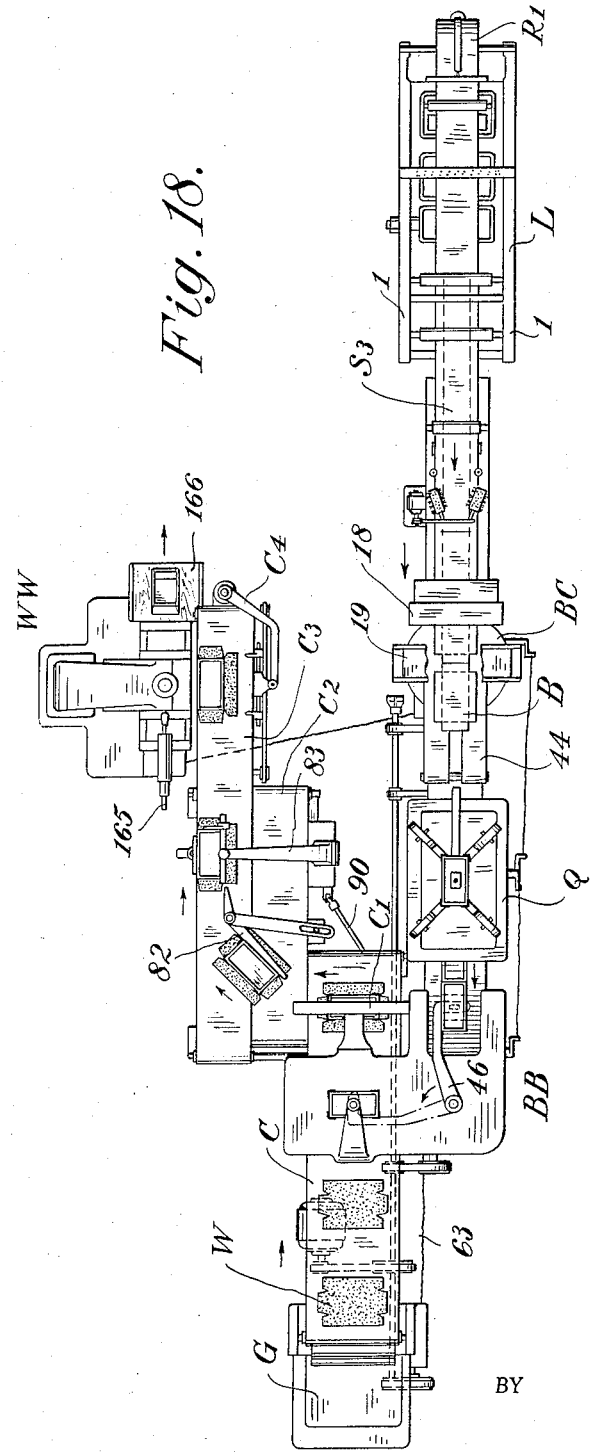

Oct. 8, 1935.  J. S. STOKES  2,016,462
BOX MAKING SYSTEM
Original Filed April 11, 1933   14 Sheets-Sheet 13
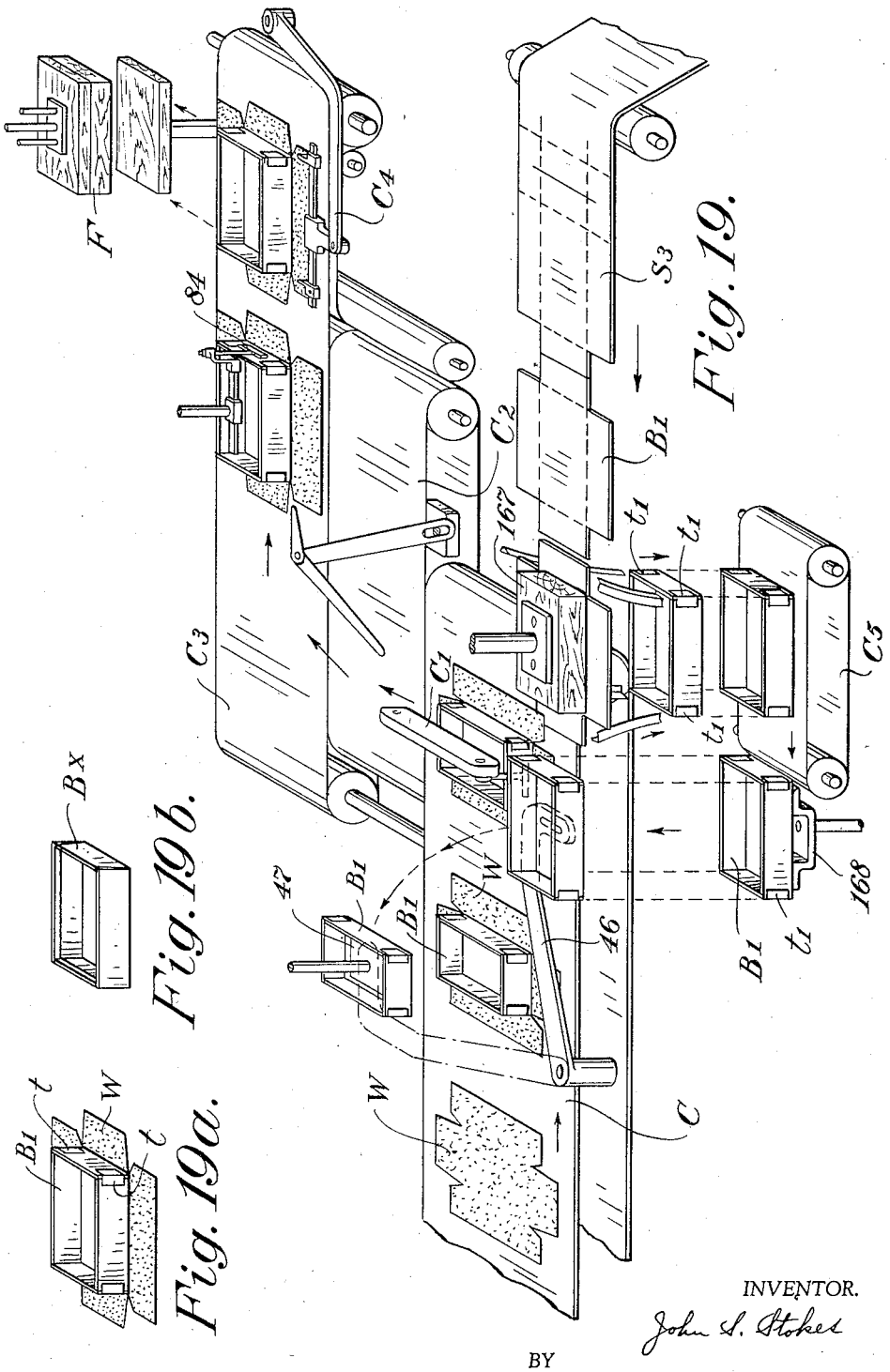

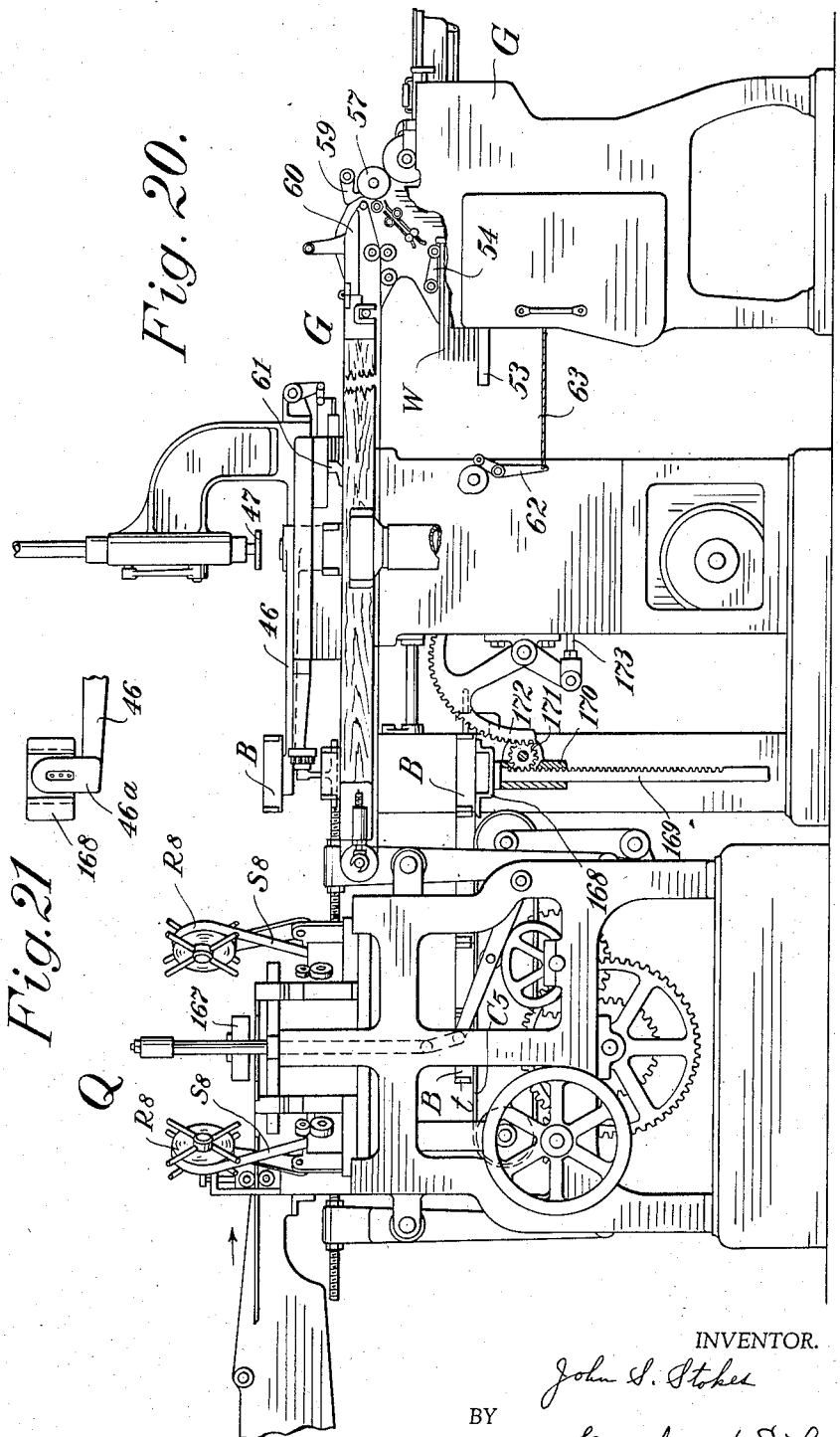

Patented Oct. 8, 1935

2,016,462

UNITED STATES PATENT OFFICE 2,016,462

BOX MAKING SYSTEM

John S. Stokes, Huntingdon Valley, Pa., assignor to Stokes and Smith Company, Philadelphia, Pa., a corporation of Pennsylvania Application April 11, 1933, Serial No. 665,520
Renewed January 18, 1935

21 Claims. (Cl. 93—43)

My invention relates to systems for making boxes, box covers, containers and the like, hereinafter generically termed boxes.

In accordance with my invention, the system comprises mechanism for cutting box blanks from strip material synchronized with mechanism for coating and feeding wrappers, labels, or the like, and with transfer mechanism which effects engagement between the wrappers and blanks in succession to form assemblies, which are transported by timed mechanism to a box-forming or wrapping machine.

My invention also resides in the combinations, and arrangements, hereinafter described and claimed.

For an understanding of my invention reference is to be had to the accompanying drawings, in which:

Fig. 1 is a top plan view of a complete box-forming system.

Fig. 2 in perspective, illustrates diagrammatically the successive box forming operations as effected by the system of Fig. 1.

Fig. 2a, in perspective, represents a box and wrapper assembly immediately prior to final wrapper applying operations.

Fig. 2b, in perspective, illustrates a completed box.

Fig. 3 is a front elevational view, on enlarged scale, of one of the units of the system of Fig. 1.

Fig. 3a shows on enlarged scale, a side elevational view of a laminated, lined strip.

Fig. 4 is a top plane view of the mechanism shown in Fig. 3.

Fig. 5 is an elevational view on enlarged scale of a unit of the system of Fig. 1, which forms box blanks from strip material.

Fig. 6 is a plan view of a strip of box material illustrating scoring and cutting operations.

Fig. 6a illustrates one of the blanks.

Fig. 9 on enlarged scale illustrates a device for transferring the box blank and wrapper assemblies.

Figs. 9a and 9b are detail views illustrating parts shown in Fig. 9 in different operating positions.

Fig. 10 is an end elevational view partly in section of structure shown in Fig. 9.

Fig. 11 is a rear elevational detail view of parts shown in Fig. 9.

Figure 8:
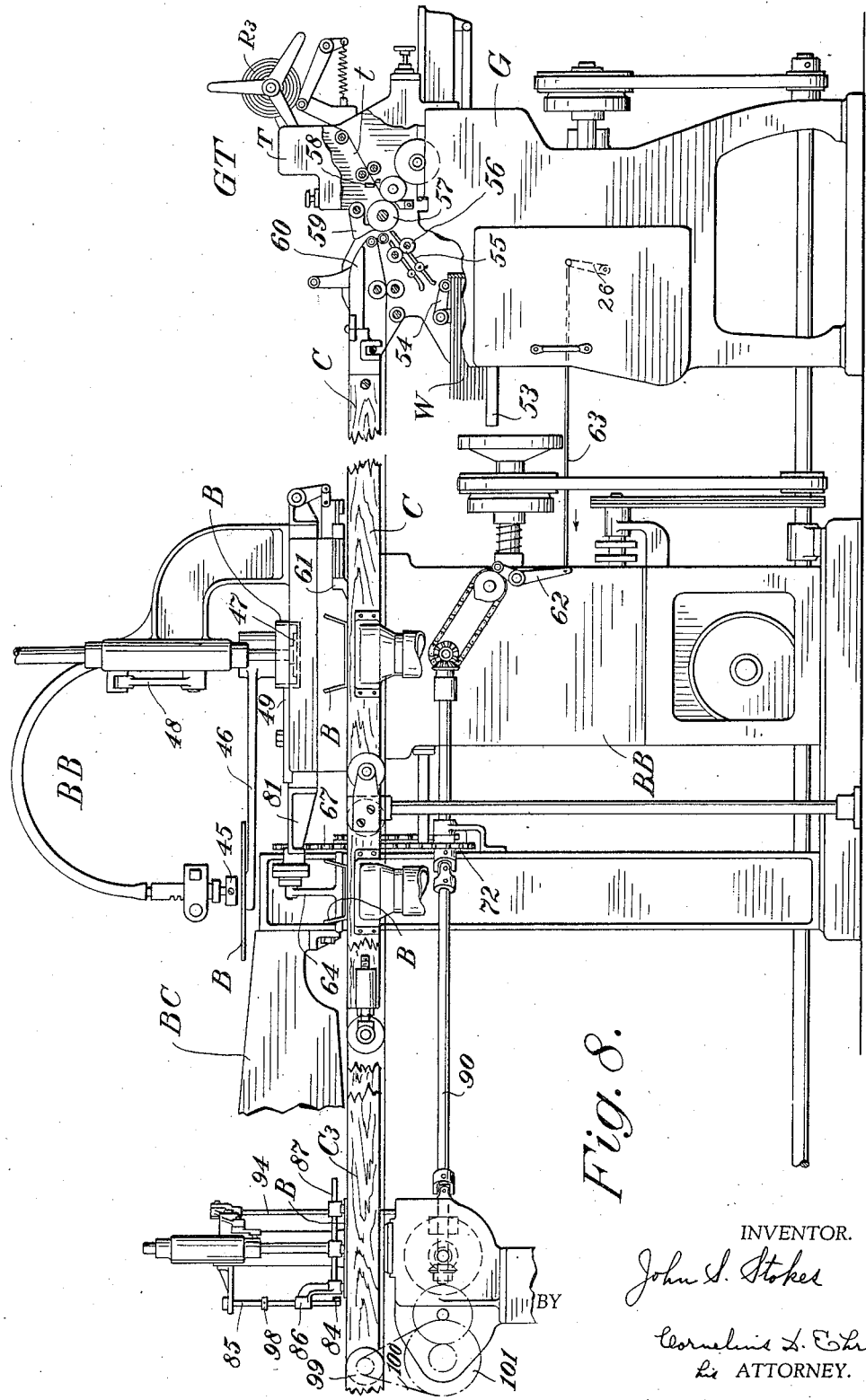
Fig. 8 is an elevational view on enlarged scale, of units shown in Fig. 1, including the wrapper coating and tabbing mechanism, and box-blank bending mechanism.

Fig. 12 is a detail view with parts in section of mechanism shown in Figs. 1 and 8 for effecting engagement between the side panel of the box blank and the corresponding wrapper panel.

Figs. 12a and 12b illustrate parts shown in Fig. 12 in different operating positions.

Fig. 12c is an end view of mechanism shown in Fig. 12, with parts in section for clarity.

Figure 13:
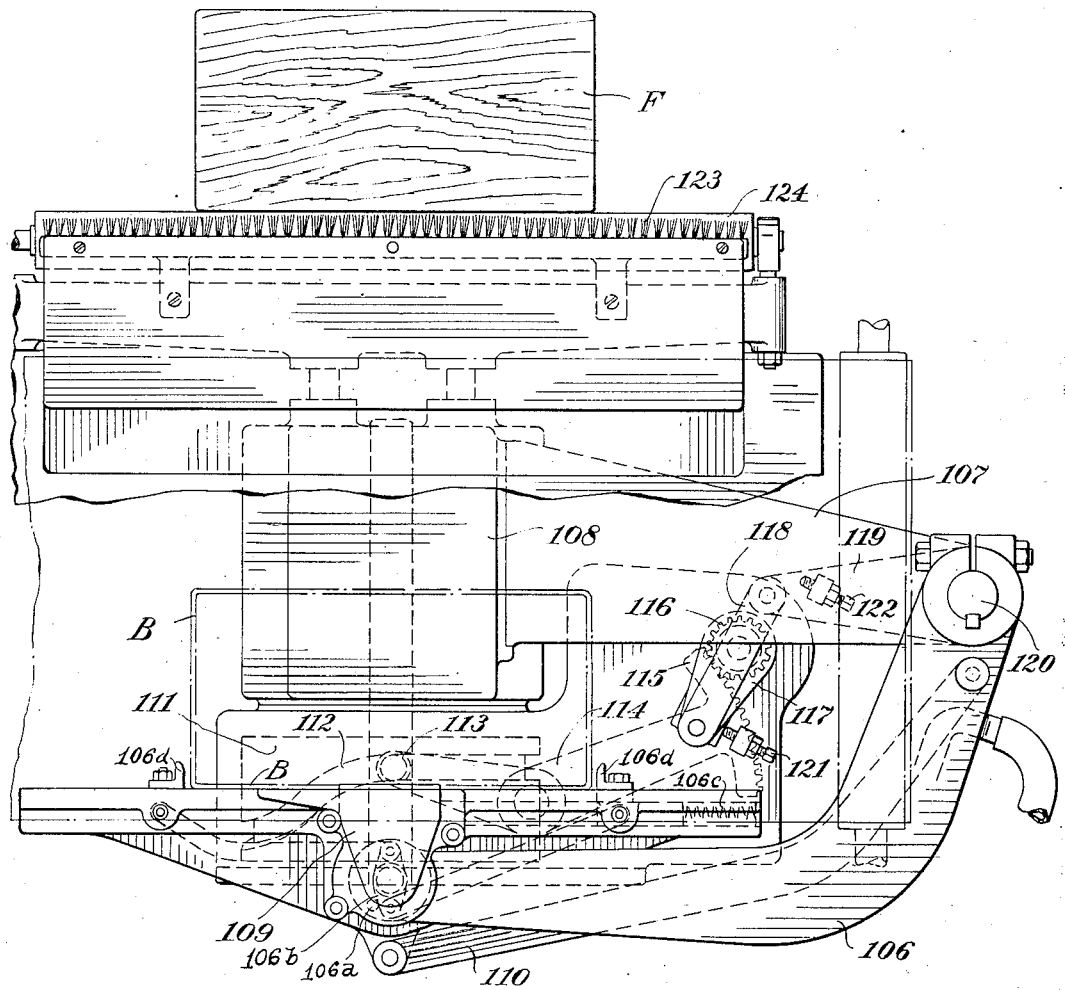

Fig. 13 is a top plan view of transfer mechanism shown in Fig. 1.

Figure 14:
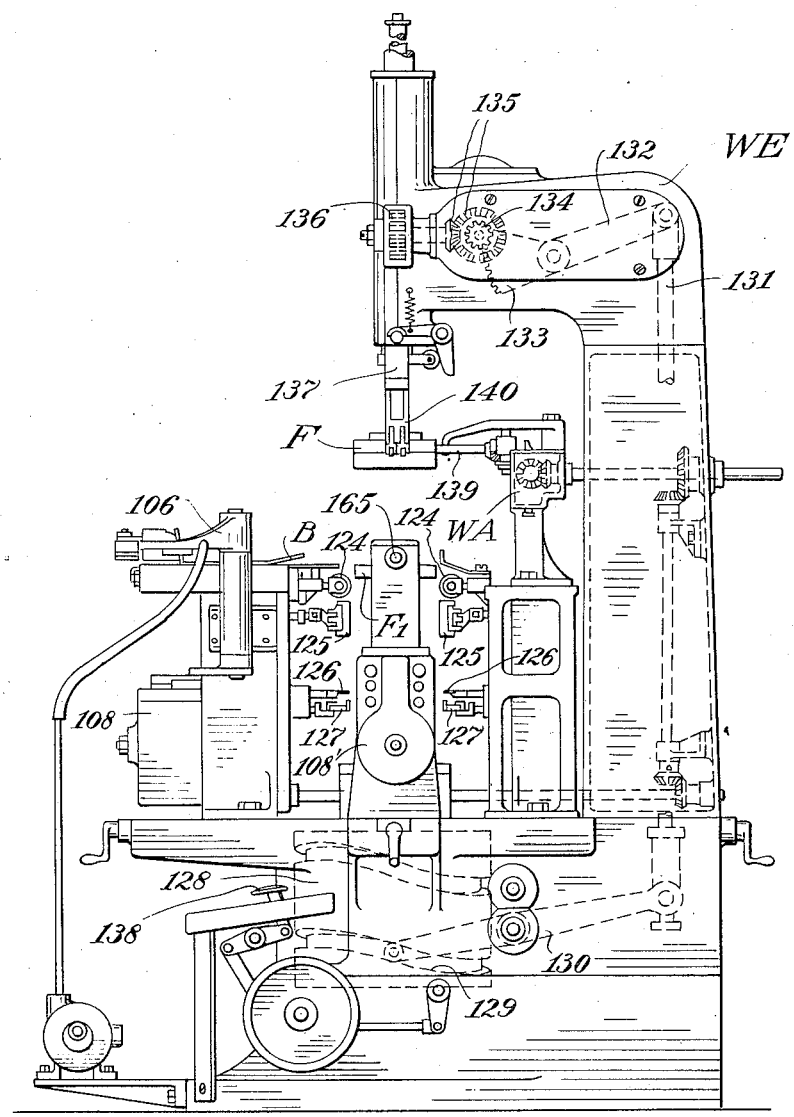

Fig. 14 is a side elevational view on enlarged scale of the wrapper applying unit shown in Fig. 1.

Fig. 15 on enlarged scale, illustrates mechanism for making laminated or lined strip from which box components are cut.

Fig. 16 is a top plan view of Fig. 15.

Fig. 17 is a detail view illustrating the arrangement for effecting desired extent of feed of the strip formed by the apparatus of Fig. 15.

Fig. 18 is a top plan view of a modified box wrapping system.

Fig. 19 in perspective, illustrates diagrammatically the successive box forming operations as effected by the system of Fig. 18.

Fig. 19a illustrates the box and wrapper assembly immediately prior to the final wrapping operations.

Fig. 19b illustrates the completed box.

Fig. 20 on enlarged scale, illustrates in front elevation, units of the system of Fig. 18.

Fig. 21 is a detail view in top plan of parts shown in Fig. 20.

Referring to Fig. 1, the wrapping machine WE may be of any suitable type; for example, it is preferably of the type disclosed in Rider applications Serial No. 425,751, filed February 4, 1930; Serial No. 460,859, filed June 13, 1930; Serial No. 490,400, filed October 22, 1930; Serial No. 611,995, filed May 18, 1932; and Federwitz application Serial No. 522,739, filed March 6, 1931; gluer GT is preferably of the type shown in Rider Patents 1,857,260, and 1,806,181; bender unit BB is preferably of the type disclosed and claimed in Stokes et al. application Serial No. 658,934, filed February 28, 1933; unit BC for cutting blanks from a strip of box material is preferably of the type disclosed and claimed in Stokes et al. application Serial No. 655,194, filed February 4, 1933, and unit L for forming lined or laminated strip, is preferably of the type disclosed in the last-named application of Stokes et al.

Referring to Figs. 3 and 4, the frame 1 supports one or more rotatable drums each adapted to carry a roll R of cardboard or like box material. The strip S from the roll R passes over an idler 3 carried by the bellcrank 4, and thence over the roller 5 to the scoring unit 7. As the strip S is pulled from the roll R by the unit BC, hereinafter described, the knives 8 score or crease the under side of the strip S. The bell crank 4 is oscillated by the rod 9, arm 10 and rod 11, intermediate the intermittent feeding movements of the unit BC, to produce a loop or slack in the strip which is taken up by the next feeding movement of the unit BC. The strain of unrolling the roll R which is often heavy and large, is not therefore imposed upon unit BC. Brake strap 12 prevents the roll R from over-travelling.

If it is desired to produce a lined box, the strip S1 of lining material from the roll R1 is threaded through the machine over the adhesive applying roll 13 and into contact with the strip S as it passes over roll 5, the brushes 14 assisting in effecting intimate contact between the upper face of the strip of box material S and the under surface of the lining or covering strip S1.

When it is desired to produce a laminated strip for formation of a stronger or heavier box, roll 5 is allowed to rotate in a reservoir of adhesive so that the under surface of the strip S is coated with adhesive prior to its contact with the upper face of strip S2 removed from roll R2 as the latter strip passes over the roll 15. The composite strip passes to the second scoring head 16 whose knives 17 when swung into position effect scoring of the under surface of strip S2. Preferably the spacing between the knives 17 of the second scoring head, is slightly greater than the spacing between the knives 8 of the first scoring head to allow for the thickness of the strips.

The composite strip S3 (Fig. 5) is gripped by jaw structure of the reciprocating carriage 18 of the blanking machine BC, or in simpler installations where laminating and/or lining is not contemplated, the strip S3 may come directly from a reel or roll. In either case as the carriage 18 moves to the left to the position shown it pushes the leading edge thereof between the knives of the head 19 which effect, or complete, severance of blanks of the type shown in Fig. 6a, from the strip.

As set forth in the aforesaid application, the transverse scores y, y and slits z may be formed by knives of the carriage 18, or as disclosed in the same application the carriage 18 may be used simply for feeding the strip to the head 19 whose knives perform cross-scoring and removal of waste pieces O. Particularly for the case when the strip S3 is removed from a roll, i. e., when the system does not include the mechanism shown in Figs. 3 and 4, there is provided the rotatable structure 20 which carries the sets of scoring knives 21, 22, so that scoring x, x of the strip longitudinal thereof, is effected during feed by the carriage 18.

The motor 23 of the blank forming unit through the belt 24, pulley 25, clutch mechanism controlled by handle 26, and gear 27, drives the cam 28 having a slot 29 which rocks the lever 30. The link 31 connects lever 30 to arm 32 to effect oscillation of the gear segment 33 to effect rocking of the crank 34 which has a crank pin connected to the rod 35 for effecting reciprocation of carriage 18. The shaft 36 driven from gears 37, 38, shaft 39 and gear 27 operates the slide 40 of the carriage 18, as clearly and fully described and illustrated in the aforesaid Rider application.

It suffices here, to say that the timing is such that the slide 40 is moved upwardly to clamp the strip S3 against the top plate 41 when the carriage 18 is at its extreme right limit of travel as viewed in Fig. 5. The carriage then moves to the left to push the strip ahead of it between the separated jaws of the head 19. The slide 42 of head 19 carrying suitable knife structure is then moved upwardly to complete the trailing end of one blank and to form the front end of the next blank. While the strip is held by the clamping action of head 19 the slide 40 of carriage 18 is moved downwardly and remains down for and during return stroke of the carriage.

The completed blank, Fig. 6a with transverse scoring y, y and longitudinal scoring x, x is transferred by mechanism including rolls 43 and the conveyor 44 to the receiving station of the blank-bending machine, BB, which is more fully illustrated and described in the aforesaid Rider application Serial No. 658,934.

Figure 7:
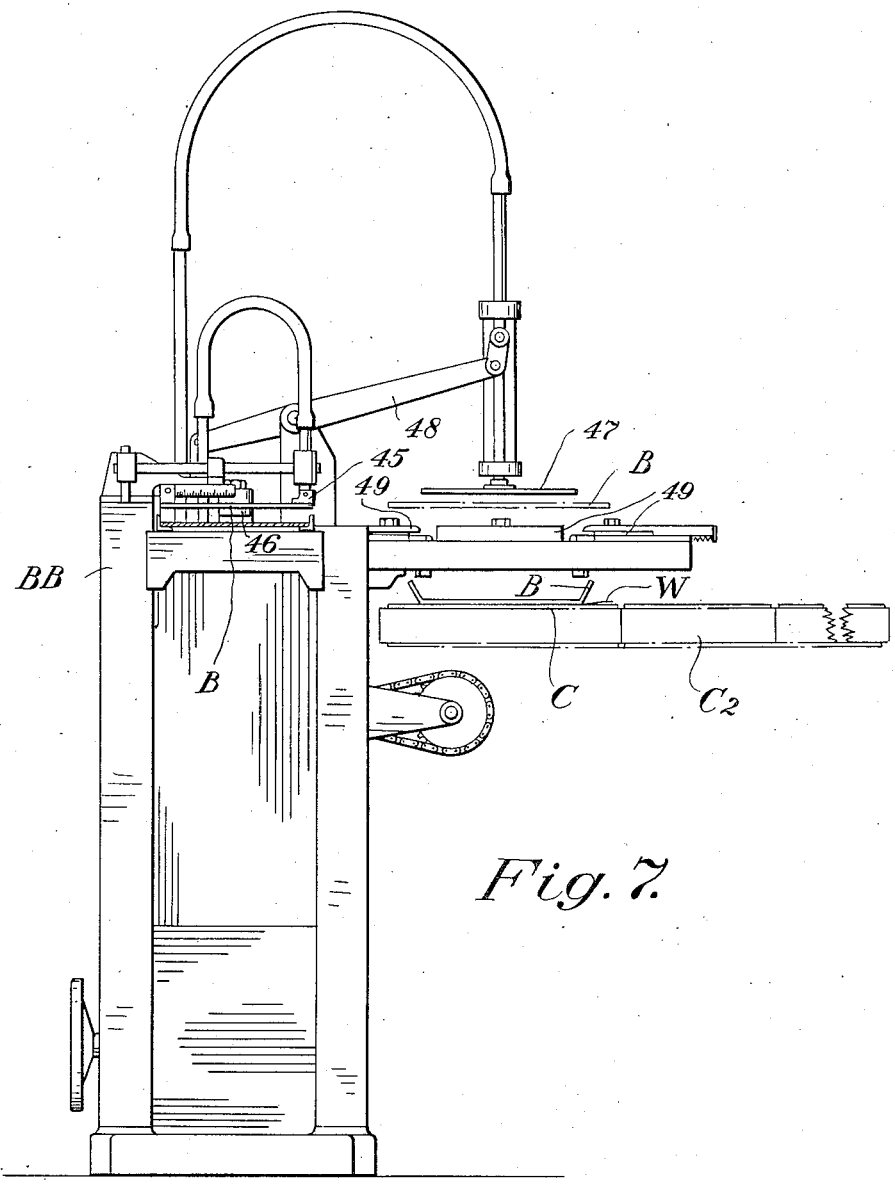
Fig. 7 is a side elevational view of mechanism for bending blanks received from the mechanism of Fig. 5.

The box blank is lifted by the vertically reciprocating suction gripper 45 of the bending unit BB to allow the transfer arm 46 to swing under the blank. Suction applied through a pad at the outer end of the arm holds the blank securely thereto. The suction gripper 45 is then withdrawn and lifted from the position shown in Fig. 7 to allow arm 46 to swing in the direction of the arrow, Fig. 1, to carry the box blank B beneath the suction plunger 47 which descends into engagement with the blank. The suction of arm 46 is thereupon cut off and the arm 46 swings back, to the full line position of Fig. 1, for reception of the next blank formed by the unit BC.

The plunger 47 with the blank adhering thereto is moved downwardly by its arm 48 until it is opposite the reciprocating slides 49. One pair of these slides moves inwardly to fold over the side panels of the blank, and the other pair of slide panels thereafter moves inwardly to bend over the end panels of the blank, assuming it to be of the one-piece type such as shown in Fig. 6a. If the blank is the main component of a three-piece box, Fig. 1a, one set of bending tools 49 may either be disconnected or allowed to operate idly. Thereafter downward movement of the plunger 47 is resumed, and the scored, bent blank deposited upon an adhesive-coated wrapper W resting below the plunger on the upper face of the conveyor C. The suction of the plunger 47 is released and it returns to its upper position shown in Fig. 7 for the reception of the next blank transferred thereto by the arm 46. The bending machine BB and the blank forming machine BC are synchronized by the cable 50 which connects the one-cycle tripping lever 51 of the blank forming machine BC to the arm 52 of the blank bender BB.

The gluer unit GT for supplying the wrappers is, as above stated, preferably of the type disclosed in Rider Patents 1,857,260 or 1,806,181. Briefly, the wrappers stacked on the table 53 of the gluing unit are removed one at a time by the suction arm 54 which delivers them into the guides 55 from whence the rolls 56 feed them into engagement with the adhesive-coated roll 57 of the gluing unit. When it is desired to utilize tabbed wrappers, the tabbing unit T described in the aforesaid Rider patents is brought into operation. The tab strips t removed from the rolls R3 are cut by the knife structure 58, the roll 57 transporting them around and into engagement with the wrappers. Each tabbed and freshly coated wrapper is in turn deflected from the glue roll by the blade structure 59 onto the nose 60 of the conveyor C preferably of the type disclosed and claimed in Davis Patent 1,818,198, where it is held flat by suction.

The operation of the gluer and tabbing unit GT is intermittent, i. e., the wrappers W are removed in succession and delivered to the conveyor which moves them step by step beneath the plunger 47 of the blank bender machine BB, which as above stated, deposits the blanks in succession onto the wrappers, each reciprocation of the plunger 47 effecting adhesive engagement between the bottom panel of a blank and the bottom panel of a wrapper. The unit is provided with its usual one-cycle clutch which is engaged upon tripping of the operating lever 26 of the mechanism and which is automatically disengaged when the cycle has been completed.

For ensuring accurate registration of the wrappers, there is provided the re-registering gripper 61 which after a wrapper has passed beneath it and the conveyor C is at rest, is dropped in back of the trailing end of the wrapper. It is then advanced and suction applied for grasping of the wrapper. The gripper 61 carrying the wrapper then moves back to a definite registered position, and while in this position with the conveyor C still stationary, the plunger 47 deposits a box blank B upon it. The specific operating mechanism is fully described in co-pending application Serial No. 658,934. The tripping lever 62 of the blank bending unit BB is controlled by the link or cable 63 from the gluer GT.

The assembly of the box blank and wrapper is moved from beneath the plunger 47 by conveyor belt C to a position adjacent the transfer device C1 shown in detail in Figs. 9 to 11. The inverted T-shaped arm or member 64 of the device is adapted to engage the box blank and push it transversely of the conveyor C onto an intermediate conveyor member C2. The arm 64 as shown is pivotally mounted on a member 65 which is reciprocated by the chain 66 driven by chains 67, 67a and 68 through the sprockets 69, 70, 71 and 72. The arm 64 is held in the position shown in Fig. 9 against the stop 73 of block 65 by spring 74 which encircles the rod 75 pivotally secured to the end of arm 64' and slidable through the pivoted block 76. After arm 64 has moved to such extent that the box blank and wrapper assembly have been transferred to the conveyor C2, engagement of arm 64 is effected with the stop or pin 77 so that as member 65 continues to move forward, arm 64 is swung in clockwise direction until eventually the pivot point 78 passes over center whereupon the spring 74 expands quickly to move the arm 64 to the position shown in Fig. 9b. Shortly thereafter the direction of movement of chain 66 is reversed to return the member 65, with the arm 64 raised to avoid obstruction to movement of the next blank B to this transfer station. As the member 65 approaches its extreme left position, the arm 64 engages the stop 79 which upon continued movement of member 65 effects counter-clockwise movement of arm 64 until finally the pivot 78 passes over dead center in reverse direction so that spring 74 expands quickly to return the arm 64 to its vertical position against stop 73.

The frame member 80 which guides the chain 66 is mounted upon a bracket 81 secured to and extending from part of the frame work structure of the blank bending unit BB. The construction shown in Fig. 11 provides for tightening of chain 66. The forward section 80a of frame 80 which carries one of the sprockets for chain 66, is secured to frame 80 by bolt 66a in the position determined by adjustment of the screw 66b.

Due to the natural resiliency of the box material in the case of the unstayed blank, the side walls of the blank are more or less erect. One of these engages the bar 82 which extends above the surface of the intermediate conveyor C2, and as this conveyor moves to the right, Fig. 1, the box blank and wrapper assembly, is turned through a substantial angle, and brought onto the conveyor C3. The continued movement of the box blank and wrapper assembly to the right is accompanied by further turning movement, so that eventually the blank and wrapper assembly rotates through an angle of substantially 90° from the position which it occupied on conveyor C. In the case of stayed blanks, the side walls are held erect by the previously applied stays or tabs.

Conveyor C3 moves intermittently in timed relation to the units previously described, and with the wrapping machine WE. When the assembly on conveyor C3 is in position below arm 83, the flap-sticker mechanism shown in Figs. 12 to 12c effects engagement between at least one of the side panels of the box blank and the corresponding wrapper panel.

More specifically, as each assembly moves to the right, Fig. 1, it is arrested by the stop 84 at the lower end of rod 85 which is slidably mounted in arm 86 carried by the bar 87 which extends through the reciprocating plunger 88. The cam 89 driven from shaft 90 through the gears 91, 92 controls the oscillation of the bell crank lever 93 to one arm of which is connected the link 94 whose upper end is adjustably pivoted to one arm 95 of the pivoted lever 96 for effecting reciprocation of the plunger 88. As the plunger 88 descends the stop member 84 moves with it until it engages the upper surface of the conveyor (Fig. 12a) whereupon the rod is arrested and for further downward movement of arm 86 simply slips with respect thereto. The fingers 97 carried by the bar 87 press down one side of the blank as shown in Fig. 12b, into engagement with the corresponding panel of the wrapper. Thereafter the cam 89 moves the plunger upwardly, the arm 86 engaging the collar 98 of bar 85 to lift the stop 84, the parts eventually resuming the position shown in Fig. 12 with the stop 84 sufficiently high to clear the upstanding side wall of the blank so that for the next movement of the conveyor the assembly is transferred to the next station.

Figs. 12 and 12c also show the mechanism for effecting intermittent synchronized drive of the conveyors C2 and C3. The driving roller 99 for the conveyors is suitably connected as by a belt or chain 100 to the gear or pulley 101 to whose shaft is secured a gear 102 in mesh with driving gear 103 to the shaft of which is attached the Geneva wheel 104. The driving pawl or pin 105 for the Geneva wheel is secured to the shaft of cam 89. The timing is such that the reciprocation of the plunger 88 is effected while the conveyor is stationary.

By subsequent intermittent movement of conveyor C3 the assembly is moved from its position beneath the plunger 88 to a position in front of the wrapping unit WE from which it is moved by transfer mechanism C4 including the arm 106 which is pivotally mounted upon the bracket 107 extending from the slide 108 of the wrapping unit beyond the end of conveyor C3. Suction is exerted upon one of the side walls of the blank B by the head 109 which is pivoted to arm 106. Pin 106a in arm 106 swings away from lever 106b upon clockwise movement of arm 106, causing the springs 106c to press the clamping fingers 106d against the box structure B. Upon return stroke of arm 106, pin 106a engages lever 106b to open the clamping fingers 106d for reception of another box.

The arm 110 connected to the head 109 constitutes with arm 106 a parallel motion linkage for effecting rectilinear movement of the box from its position on the conveyor to a registered position directly beneath the form block F of the wrapping unit WE. The movement of the head is controlled, and timed by the cam 111 having a groove 112 with which engages the cam follower 113 at one end of the bell crank 114 whose other end is provided with a gear segment 115 engaging with gear 116 to whose shaft is secured the arm 117. The link 118 connects the arm 117 to arm 119 of the shaft 120 to which arm 106 is secured. The mechanism is constructed so that when the head 109 is in its receiving position shown in Fig. 13, the axis of rotation of arm 117 is in the same straight line as the centers of rotation of the opposite ends of the link 118. This relation can readily be effected by adjustment of the stop 121. Similarly, when the head 109 is at the other end of its stroke the aforesaid centers are again in the same straight line, the stop 122 being adjustable for that purpose. This provision insures that the head at both ends of its stroke will always come exactly to the same positions.

Assuming that the box blank is of the onepiece type, the completion of the box is effected by its downward movement through the wrapping machine WE in the well-known and usual manner.

The wrapping unit WE, which for universal use is preferably of the type disclosed and claimed in application Serial No. 425,751, filed February 4, 1930, is shown in Fig. 14. Descent of the plunger or form block F, clamps the blank and wrapper assembly against the platen F1. During the further downward movement of the form block and assembly the several wrapping instrumentalities such as the brushes 123, rolls 124, flap turn-in elements 125, marginal turn-in blades 126, and presser blocks 127 of the slides 108, 108′ effect completion of the box in the well known and usual manner.

The movement and timing of the form block is effected by the cam 128 having a cam groove 129 which effects oscillation of the lever 130 connected through link 131 to arm 132 which effects rocking movement of the gear sector 133. Through a train of gears including the gear 134, bevel gears 135, and gear 136 which engages a rack attached to or integral with the plunger rod 137 of the form block, reciprocation of the form block is effected. The treadle 138, when depressed and released, trips the clutch to allow one cycle of movement of the wrapping machine as is usual practice, and as more fully described in the aforesaid application. If the treadle is held down, the cycle repeats until the treadle is released whereupon the machine finishes the cycle and stops.

The tripping of the wrapping machine as in prior simpler combinations utilizing a wrapper, and a gluer, effects tripping of a gluing machine so that it performs one cycle of its operation for each cycle of the wrapping machine. The gluer, as previously described, is, in the present system, mechanically coupled to the conveyor system including conveyor C, transfer member C1, conveyors C2 and C3, and transfer system C4, so that for each tripping of the wrapping machine each of the wrappers and assemblies is advanced to the next stage, and concurrently another box blank is formed from the strip S, and a blank formed by the unit BC is bent and deposited upon a wrapper to form an assembly, i. e., at any given instant there are several boxes in as many different states of completion.

The system thus far described is capable of forming complete boxes when the blanks cut from the strip S3 are of the one-piece type shown in Fig. 6a. If, however, the blanks B are of the type shown in Fig. 1 for forming only the bottom and sides of a box, it is necessary to supply the box end components to the form block of the wrapping machine prior to descent of the plunger. Though this could be performed manually, it is preferably performed by automatic mechanism operating in timed relation to the delivery of the assemblies to the wrapping machine.

The apparatus or mechanism for supplying box end components is preferably of the type shown in the aforesaid Rider application Serial No. 425,751. It includes the units WA for feeding and cutting the strips S4 into elements of correct size to form the ends of the boxes, and the transfer arms 139 swing the end elements E as formed against the end of the form block, where they are gripped and held by the clamping devices 140. During descent of the plunger these end components are attached to the main component or blank by the application of the wrapper, all as fully described and claimed in the aforesaid application of Rider.

The strip S4, particularly when the box ends are to be of single thickness, may be supplied from a simple reel or roll. When, however, the system is to be used for making lined and/or laminated box ends, it is preferable that a pair of mechanisms, such as shown in Figs. 15 and 16, be utilized for producing laminated or lined strips, as the strips are fed by the units WA.

More specifically, the strip S5 is removed from the roll R5 carried by the reel 141 supported by the frame 142 of the unit EM. The strip passes over the idler rolls 143, 144 to a unit WA. To relieve this unit of the strain of rotating the heavy roll or reel R5, there is preferably provided feeding mechanism having the pawl 145 operating alternately with the feeding mechanism of unit WA to produce slack in the strip S4 which is removed by the unit WA. Specifically, the shaft 146 which drives the mechanism of the units WA is provided with a gear 147 driving the corresponding gear 148 upon whose shaft 149 is secured a crank arm 150 having a crank pin 151 adjustable as by rotation of the threaded member 152 to vary the throw of the effective crank arm. Upon the pin 151 is pivoted the link 153 whose other end is connected to the cross bar 154 which supports a bracket for the gear 155 which meshes with a lower stationary rack 156 and an upper rack 157 attached to or integral with the slide 158 which is guided by the bars 159 and upon which is mounted the support 160 for the feeding pawl 145. As the slide 158 is moved to the left the pawl 145 tends to swing in counter-clockwise direction and so freely to effect a driving engagement with the strip S4. For the return movement of the carriage, the pawl 145 tends to swing in clockwise direction and merely slides along the upper surface of the strip. As thus far described the arrangement is suitable for feeding a single thickness of strip.

The strip of box material may be covered or lined by suitable material removed from the roll or reel R6 supported by the frame 142 of the unit. The strip passes over the adhesive applying roll 161 for coating of the under side of the lining strip S6 which is brought into engagement with the upper surface of the strip S5, for example, as it passes over the roll 144. Excessive adhesive is removed from the strip prior to its application to the box material strip by scraper 162 or equivalent.

To produce a box component of multiple thickness, in addition to the strip removed from roll R5, the strip S7 is removed from roll R7 coated with adhesive by its passage over the roll 163 and brought into engagement with the upper surface of strip S5 as the latter passes over roll 144.

The laminated strip may be lined, generally as above described, the lining strip S6 in this instance however, directly engaging the strip S7. More intimate contact is assured by the brushes 164. This mechanism is in general similar to that shown in Figs. 3 and 4, and the mechanisms in fact are equivalent in function.

The mode of operation of the entire system as described, can be most readily understood by reference to Fig. 2 which diagrammatically illustrates the wrappers, box blanks, box assemblies, etc., in the successive stages. Briefly, the box blanks B are cut from the strip S3 and delivered by conveyor 44 to arm 46 which receives them in succession and transfers them to plunger 47 which brings them into association with the plates 49 for bending them along their scoring, and in succession deposits the blanks upon wrappers delivered by conveyor C in succession to the wrapping station. The assemblies in turn are transferred from the conveyor C to the form block by a conveyor system including the transfer conveyor C1, and the conveyors C2, C3 which swing the assemblies through 90°, deliver them beneath the flap-sticker plunger 88, and subsequently to position for transfer during the preparation of the assemblies, the end components E are being fed and cut from the strips S4 so that as each assembly is delivered to the form block a pair of end elements or components are substantially concurrently brought against the ends of the form block.

For each cycle of operation of the wrapping machine a completed box Bx as shown in Fig. 2b is ejected by the mechanism 165 to the discharge chute 166, and during the cycle the wrappers, box blanks, and box and wrapper assemblies each advance one step toward the wrapping machine, i. e., the strip S is advanced and a box blank cut therefrom, a previously cut blank is transferred to the box bender; a box and wrapper assembly formed by operation of the plunger 47 is transferred to the station adjacent conveyor C1, the box and wrapper assembly previously at the conveyor C1 has been transferred toward the flap-sticker plunger 88 and the assembly previously at that station has been advanced toward or to position for transport by the mechanism C4 to the form block.

All of the units are adjustable to form boxes varying widely in their dimensions. For different sizes of boxes, it is of course necessary to use different sizes of wrappers; it is not necessary to change rolls R6 unless the height of the boxes is to be changed, nor is it necessary to change rolls R, R2 unless the sum of the width of the box plus twice its height is to be changed.

In the event that for any reason, a blank is not deposited on a wrapper by plunger 47, the wrapper simply eventually falls off the end of conveyor C and does not continue along the normal path of the assemblies to the wrapping machine thus avoiding any possibility of the adhesive coated wrapper from becoming entangled in the subsequent mechanism of the system.

The conveying elements C1, C2, C3, C4 may be omitted and a human operator employed to transfer the assemblies from conveyor C to the wrapping machine, or to a feed-slide corresponding generally to C4, i. e., the wrapping machine may be of the type shown in Rider et al. application Serial No. 490,400, or Rider application Serial No. 611,995. In such modification, all units are synchronized as above described. However, the full automatic system is preferred.

A modification of the system is shown in Fig. 18. The principal difference is that it is adapted to stay each box blank or to hold its walls in box-forming position prior to application of the wrapper. One-piece box blanks of the type shown in Fig. 6a are formed from the strip S3 by the blank-forming unit BC as before. However, between this unit and the blank bending unit BB there is interposed a machine known in the art as a quad-stayer, such as exemplified by Davis et al. Patent 728,086. By this machine or unit, each box blank is brought with its sides into vertical or box forming position and stays $t_1$ are applied to the corners. The stayed blank or unfinished box is transferred to the arm 46 of the unit BB, which deposits it upon wrappers delivered from the gluer G by the conveyor C. The remainder of the units and their operations are substantially as above described.

If all boxes to be made by the system are to be of the one-piece type the wrapping machine W may be of the simpler type shown in U. S. Letters Patent 1,541,255 to Federwitz et al. The gluing unit G may be of the simpler type shown in Federwitz Patent No. 1,770,483, or may be of the type shown in Fig. 1, i. e., provided with the tabbing attachment T.

Referring to Fig. 20, the unstayed box blanks from the unit BC are delivered beneath the former or block 167 of the staying unit Q. As the block carries the blank downwardly, the sides of the blanks in the usual and known manner are bent to vertical position and tabs $t_1$ cut from the strips S8 are automatically applied to the vertical corners of the blank. This operation takes place once for each cycle of operation of the wrapping machine which is timed to the blank forming machine. The stayed blanks or partially finished boxes are transported by the conveyor C5 to position above the U-shaped plunger 168. The stayed blanks in succession are raised by the plunger 168 to position above the receiving position of the transfer arm 46 of the unit BB. With the plunger in its raised position, the arm 46 swings to bring its suction head 46a into the groove of plunger 168 beneath the stayed blank or box, Fig. 21. The plunger 168 thereupon descends to receive the next box and the arm 46 swings to bring the box beneath the plunger 47. Generally as before, suction is then applied to hold the box, and the suction of arm 46 is discontinued, the arm 46 then returning to receive the next box blank which in the meantime has been raised to position by the plunger 168.

The mechanism for lifting the plunger is clearly shown in Fig. 20. The plunger rod 169 is guided by the support 170 and is provided with a rack meshing with a pinion 171 which is driven by the gear segment 172 oscillated by reciprocation of rod 173, suitably operated from the driving mechanism of the box bending unit. The quad-stayer Q, the box bender BB, and the blank forming machine BC are synchronized to the gluer and wrapping units.

The operation of the system is clearly illustrated in Fig. 19. The box strip S3 is cut to form one-piece box blanks B which in succession are delivered to the former 167 of the quad-stayer. The tabbed blank or box formed by the operation of this machine is transferred by the conveyor C5 to the plunger 168 which lifts it to such position that the arm 46 of the bender unit BB can receive it. The arm 46 moves the box beneath the plunger 47 which operating in timed relation to the gluer deposits the stayed box or blank upon a wrapper W directly beneath. The assembly of box and wrapper moves to the conveyor C1 which transfers it to the conveyors C2, C3. The fingers 97 are removed from the plunger 88 so that there simply remains the stop 84 which serves to define a definite position from which the assembly moves to its position adjacent the transfer member C4.

As in the first system, the wrappers upon the conveyors C, C2, C3 are preferably subjected to suction to hold them flat. This suction is preferably acting during register of the box or box blank thereon by plunger 47, although the suction may have been discontinued temporarily during re-register of the wrapper by the gripper 61. Preferably, suction is also acting to hold the unapplied flaps of the wrapper flat during transport of the assembly, at least to the station beneath plunger 88. The assembly is free of suction exerted through conveyer C3 during movement of the assembly transversely of the conveyor to the form block F.

In general, the systems herein described and claimed are capable of performing the methods of making boxes described and claimed in my application Serial No. 586,530, filed January 14, 1932, although their use is not restricted thereto.

What I claim is:

1. A system comprising box-wrapping mechanism, conveying means for transporting box-blank and wrapper assemblies to said box-wrapping mechanism, and means operating in timed relation to said conveying means for flattening panel structure of the blanks of the assemblies into adhesive engagement with corresponding panel structure of the wrappers of the assemblies.

2. A system comprising mechanism for feeding and scoring strip box material and for cutting therefrom box blanks each adapted to form the bottom and a pair of walls of a box, means operating in timed relation thereto for receiving said blanks and effecting their adhesive engagement with wrappers to form assemblies, means for delivering said assemblies to form block structure of a wrapping machine, and mechanism operating in timed relation to said first mechanism for feeding strip and cutting therefrom components adapted to form the other pairs of box walls, and for delivering said components to said form block structure in timed relation to delivery of said assemblies thereto.

3. A system comprising a wrapping machine, means for cutting box end components from strip box material, means for cutting blanks adapted to form the bottom and sides of a box from strip box material, means for coating individual wrappers, mechanism for synchronizing operation of all of said several means with operation of said wrapping machine, and a conveying system including means for delivering box end components to said wrapping machine, means for effecting adhesive engagement of said blanks with said wrappers in succession to form assemblies, and means for delivering said assemblies to said wrapping machine timed to the box-end delivering means.

4. A system comprising a box-wrapping machine, means for delivering box end components to form block structure thereof, and means for forming and delivering to said form block assemblies each comprising a wrapper and a blank adapted to form the box bottom and sides of a box comprising mechanism for coating wrappers with adhesive, mechanism for cutting said blanks from strip box material, and mechanism for effecting adhesive engagement of said blanks with said wrappers in succession.

5. A system comprising a box-wrapping machine, means for delivering box end components to form block structure thereof, and means for forming and delivering to said form block assemblies each comprising a wrapper and a blank adapted to form the box bottom and sides of a box comprising mechanism for coating wrappers with adhesive, mechanism for cutting said blanks from strip box material, and mechanism for effecting adhesive engagement between the bottom panels of said blanks and the bottom panels of said wrappers.

6. A system comprising a box-wrapping machine, means for delivering box end components to form block structure thereof, and means for forming and delivering to said form block assemblies each comprising a wrapper and a blank adapted to form the box bottom and sides of a box comprising mechanism for coating wrappers with adhesive, mechanism for cutting said blanks from strip box material, mechanism for effecting adhesive engagement of said blanks with said wrappers in succession, and means operating upon each of the assemblies in succession prior to its delivery to said wrapping machine to effect adhesive engagement of additional panel surfaces of the blank and wrapper.

7. A box-wrapping system comprising a box-wrapping unit, means for feeding blank-and-wrapper assemblies thereto, and means including a conveyor for rotating said assemblies in substantially a horizontal plane and delivering them to said feeding means.

8. A box-wrapping system comprising a box-wrapping unit, means for feeding blank and wrapper assemblies thereto, a conveyor for delivering assemblies to said feeding means, a second conveyor adjacent to said first conveyor for transporting said assemblies, and means for transferring said assemblies from said second conveyor to said first conveyor and concurrently swinging them through substantially a right angle.

9. A system comprising a box-wrapping mechanism, mechanism for coating wrappers with adhesive, means for conveying the coated wrappers from said wrapper coating mechanism to said box-wrapping mechanism, and means for registering box structures on said wrappers while on said conveying means comprising reciprocating transfer structure movable toward and away from said conveying means, and oscillating structure for partially rotating box structures and delivering them individually to said transfer structure.

10. A system comprising box-wrapping mechanism, mechanism for coating wrappers with adhesive, endless conveyor structure for transporting the coated wrappers from said wrapper coating mechanism adjacent to said box-wrapping mechanism, means for registering box blanks on wrappers on said conveying structure, to form assemblies, comprising reciprocating transfer structure movable toward and away from said conveyor structure, oscillating structure for partially rotating box blanks and delivering them individually to said transfer structure, and reciprocating means for transferring the assemblies from said endless conveyor structure to said box-wrapping mechanism.

11. A machine for making wrapped boxes from strip box material and individual wrappers comprising means for conveying individual wrappers, mechanism for feeding said strip box-material, means for cutting blanks from said strip box-material, and means for transferring each blank as produced without substantial delay into adhesive registered engagement with one of said wrappers.

12. A machine for making wrapped boxes from strip box material and individual wrappers comprising means for feeding an individual wrapper to an assembly station for each cycle of operation of said machine, means for feeding a strip of box-material and cutting a box-blank therefrom for each cycle of operation of said machine, and means operative once for each cycle of operation of said machine to transfer a box-blank cut from said strip by said second means into registered adhesive engagement with a wrapper transferred to said assembly station by said first means.

13. A machine for making wrapped boxes from strip box-material and individual wrappers comprising means for feeding an individual wrapper to an assembly station for each cycle of operation of said machine, means for feeding a strip of box-material and cutting a box-blank therefrom for each cycle of operation of said machine, means operative once for each cycle of operation of a said machine to transfer a box-blank cut from said strip by said second means into registered adhesive engagement with a wrapper transferred to said assembly station by said first means, box-wrapping mechanism operating once for each cycle of operation of said machine, and transfer means operative once for each cycle of operation of said machine to transfer a blank and wrapper assembly from said assembly station to said box-wrapping mechanism.

14. A machine for making wrapped boxes from strip box-material and individual wrappers comprising means for feeding an individual wrapper to an assembly station for each cycle of operation of the machine, cutting and scoring means operating for each cycle of operation of the machine to produce a scored blank from said strip material, and means operative for each cycle of the machine to receive and bend a blank produced by said cutting and scoring means, and to transfer it into registered adhesive engagement with a wrapper delivered to said assembly station by said first means.

15. A machine for making wrapped boxes from strip-box-material and individual wrappers comprising box-wrapping mechanism operating once for each cycle of said machine, mechanism for coating an individual wrapper once for each cycle of said machine, mechanism for cutting a box blank from a strip of box-material for each cycle of said machine, and a transfer system operating for each cycle of said machine to effect adhesive engagement of a wrapper coated by said coating mechanism and a blank cut from said strip by said cutting mechanism to form an assembly and for delivering an assembly to said box-wrapping mechanism.

16. A machine for making boxes comprising box-wrapping mechanism operating once for each cycle of said machine, mechanism for coating a wrapper for each cycle of said machine, conveying means for transporting wrappers from said coating mechanism to a transfer station adjacent said box-wrapping mechanism, mechanism operating once for each cycle of said machine to dispose a box blank on a wrapper for transport therewith to said transfer station, mechanism operative for each cycle of said machine to flatten wall structure of a blank into engagement with a corresponding panel of a wrapper on which the blank is disposed, and mechanism operating for each cycle of the machine to transfer a wrapper and blank assembly having wall structure flattened by said flattening means from said transfer station to said box-wrapping mechanism.

17. A box machine comprising form-block structure, mechanism for cutting box components from strip material and delivering them to said form-block structure, and means for producing and delivering to said form-block structure assemblies, each comprising a wrapper and a blank adapted to form box components complementary to said first named components, comprising mechanism for effecting registered adhesive engagement of the blanks with the wrappers in succession.

18. A system comprising a machine for applying sheet material to boxes, mechanism for cutting box components from strip material and delivering them to form block structure of said machine, and means for producing and delivering to said form-block structure assemblies, each comprising sheet material and a blank adapted to form box components complementary to said first named components, comprising mechanism effecting registered adhesive engagement of the blanks in succession with the sheet material individual thereto.

19. A system comprising box-wrapping mechanism, conveying means for transporting box-blank and wrapper assemblies toward said box-wrapping mechanism, and means operating in timed relation to said conveying means for operating upon each assembly to flatten the panel of the blank which is the leading panel as the assembly is moved toward said box-wrapping mechanism into adhesive engagement with the corresponding wrapper panel.

20. A system comprising a box-wrapping machine, means for delivering box-end components to form-block structure thereof, mechanism for cutting said components from strip box material for transfer by said delivery means, and means for forming and transporting to said box-wrapping machine assemblies each comprising a wrapper and a blank adapted to form the box bottom and sides of a box comprising mechanism for coating wrappers with adhesive, and mechanism for effecting adhesive engagement of said blanks with said wrappers in succession.

21. A system comprising a box-wrapping machine, means for delivering box-end components to form block structure thereof, mechanism for cutting said components from strip box-material for transfer by said delivery means, and means for forming and transporting to said box-wrapping machine assemblies each comprising a wrapper and a blank adapted to form the box bottom and sides of a box comprising mechanism for coating wrappers with adhesive, mechanism for effecting adhesive engagement of said blanks with said wrappers in succession, and means operating upon each of the assemblies in succession prior to its delivery to said wrapping machine to effect adhesive engagement of additional panel surfaces of the blank and wrapper.

JOHN S. STOKES.